US012673609B2

(12) United States Patent
Chavrier et al.

(10) Patent No.: US 12,673,609 B2
(45) Date of Patent: Jul. 7, 2026

(54) VEHICLE ALARM BASED ON DETECTED OPERATIONAL RISK

(71) Applicant: Volvo Truck Corporation, Gothenburg (SE)

(72) Inventors: Philémon Chavrier, Lyons (FR); Olivier Poussin, Lyons (FR); Renaud Laperriere, Lyons (FR)

(73) Assignee: Volvo Truck Corporation, Gothenburg (SE)

( * ) Notice: Subject to any disclaimer, the term of this patent is extended or adjusted under 35 U.S.C. 154(b) by 162 days.

(21) Appl. No.: 18/372,925

(22) Filed: Sep. 26, 2023

(65) Prior Publication Data

US 2024/0166129 A1     May 23, 2024

(30) Foreign Application Priority Data

Nov. 18, 2022     (EP) ..................................... 22208216

(51) Int. Cl.
*B60Q 5/00* (2006.01)
*B60Q 9/00* (2006.01)
(Continued)

(52) U.S. Cl.
CPC ............... *B60Q 9/00* (2013.01); *B60Q 5/005* (2013.01); *B60T 8/17* (2013.01); *F02D 41/0002* (2013.01);
(Continued)

(58) Field of Classification Search
CPC .. B60Q 9/00; B60Q 5/005; B60Q 5/00; B60T 8/17; B60T 2201/02; B60T 2220/00;
(Continued)

(56) References Cited

U.S. PATENT DOCUMENTS

| | | |
|---|---|---|
| 2012/0012415 A1 | 1/2012 | Oettinger |
| 2013/0189032 A1* | 7/2013 | Bellerose .............. E01C 23/065 404/91 |

(Continued)

FOREIGN PATENT DOCUMENTS

| | | |
|---|---|---|
| EP | 0752682 A2 | 1/1997 |
| EP | 3279884 A1 | 2/2018 |

OTHER PUBLICATIONS

Extended European Search Report, European Patent Application No. 22208216.6, mailed Apr. 20, 2023, 9 pages.

*Primary Examiner* — Shardul D Patel
(74) *Attorney, Agent, or Firm* — Sage Patent Group

(57) ABSTRACT

A computer-implemented method may include operating, by a processor device of a computer system, a vehicle at a predetermined speed. The method may further include receiving, from a sensor device, a sensor signal indicating an abnormal condition. The method may further include receiving, from a sensor device, a sensor signal indicating an abnormal condition. The method may further include, based on the sensor signal, determining, by the processor device, an operation risk. The method may further include, in response to determining the operation risk, activating, by the processor device, an alarm. The method may further include, in response to determining the operation risk, maintaining, by the processor device, operation of the vehicle at the predetermined speed.

19 Claims, 7 Drawing Sheets

(51) Int. Cl.
  *B60T 8/17*     (2006.01)
  *F02D 41/00*    (2006.01)
  *E01C 19/48*    (2006.01)

(52) U.S. Cl.
  CPC ....... *B60T 2201/02* (2013.01); *B60T 2220/00* (2013.01); *B60T 2250/00* (2013.01); *B60T 2250/04* (2013.01); *E01C 19/4873* (2013.01); *F02D 2200/501* (2013.01)

(58) Field of Classification Search
  CPC ............. B60T 2250/00; B60T 2250/04; F02D 41/0002; F02D 2200/501; E01C 19/4873; B60W 2040/0818; B60W 2040/0881; B60W 2050/143; B60W 2050/146; B60W 50/14; B60W 2300/125; B60W 2300/17; B60W 2520/10; B60W 10/184; B60W 30/146; B60W 10/06
  USPC ........................................... 701/50
  See application file for complete search history.

(56)         References Cited

U.S. PATENT DOCUMENTS

| | | | |
|---|---|---|---|
| 2015/0061895 A1* | 3/2015 | Ricci ..................... | G06V 40/28 |
| | | | 340/902 |
| 2015/0139730 A1* | 5/2015 | Buschmann ........... | E01C 19/34 |
| | | | 404/84.2 |
| 2016/0170415 A1* | 6/2016 | Zahr ...................... | E01C 19/48 |
| | | | 701/23 |
| 2017/0123447 A1 | 5/2017 | Kukuk et al. | |
| 2018/0001898 A1* | 1/2018 | Otake ................... | B60W 10/20 |
| 2018/0037230 A1* | 2/2018 | Otake ................... | B60K 28/06 |
| 2019/0003133 A1* | 1/2019 | Tkachenko ........... | E01C 19/004 |
| 2020/0017077 A1 | 1/2020 | Petersen et al. | |
| 2020/0114909 A1* | 4/2020 | Shelton ................ | B60W 30/09 |

* cited by examiner

300

VEHICLE ALARM BASED ON DETECTED OPERATIONAL RISK

CROSS REFERENCE TO RELATED APPLICATIONS

This application claims priority to European Patent Application No. 22208216.6, filed on Nov. 18, 2022, the disclosure and content of which is incorporated by reference herein in its entirety.

TECHNICAL FIELD

The disclosure relates generally to operational risks for vehicles, such as construction vehicles. In particular aspects, the disclosure relates to a vehicle alarm based on a detected operational risk. The disclosure can be applied in heavy-duty vehicles, such as trucks, buses, and construction equipment. Although the disclosure may be described with respect to a particular vehicle, the disclosure is not restricted to any particular vehicle.

BACKGROUND

Many vehicles, such as paver vehicles, trucks, and other types of construction vehicles, include functions that permit the vehicle to operate independently of a driver. For example, many paver vehicles are capable of operating at a low, constant speed, which may result in a higher quality paved surface. However, driver behavior may produce operational risks that may jeopardize the quality of the paved surface, such as a driver of the vehicle leaving the vehicle during the operation. Thus, there is a need for safety mechanisms that address these and other types of operational risks.

SUMMARY

According to a first aspect of the disclosure, a computer-implemented method may include operating, by a processor device of a computer system, a vehicle at a predetermined speed. The method may further include receiving, from a sensor device, a sensor signal indicating an abnormal condition. The method may further include receiving, from a sensor device, a sensor signal indicating an abnormal condition. The method may further include, based on the sensor signal, determining, by the processor device, an operation risk. The method may further include, in response to determining the operation risk, activating, by the processor device, an alarm. The method may further include, in response to determining the operation risk, maintaining, by the processor device, operation of the vehicle at the predetermined speed. The first aspect of the disclosure may seek to address the problem of a driver creating an operational hazard with respect to a vehicle. A technical benefit may include alerting the driver and/or an outside observer to the operational risk while maintaining vehicle operation to ensure quality result.

In some examples, the vehicle may be a paver vehicle. Operating the vehicle may include operating a throttle device of the vehicle to provide a constant amount of power to an engine of the vehicle, and operating a brake device of the vehicle to limit a speed of the vehicle to the predetermined speed. The sensor device may include a door sensor. The sensor signal may be indicative that a driver-side door of the vehicle is open. Activating the alarm may include activating an audiovisual alarm that is detectable outside the vehicle. Maintaining operation of the vehicle may include operating the throttle device and the brake device to maintain the speed of the vehicle at the predetermined speed. A technical benefit may include alerting a driver and/or an outside observer of an operational risk indicated by an open door via an audiovisual alarm.

In some examples, operating the vehicle may include operating a throttle device of the vehicle to provide a constant amount of power to an engine of the vehicle. A technical benefit may include performing a vehicle operation without driver input.

In some examples, operating the vehicle may include operating a brake device of the vehicle to limit a speed of the vehicle to the predetermined speed. A technical benefit may include performing a vehicle operation without driver input.

In some examples, the sensor device may include a door sensor, and the sensor signal may be indicative that a door of the vehicle is open. A technical benefit may include alerting a driver and/or an outside observer of an operational risk indicated by an open door.

In some examples, the sensor device may include a seat sensor, and the sensor signal may be indicative that a driver-side seat of the vehicle is not occupied. A technical benefit may include alerting a driver and/or an outside observer of an operational risk indicated by an empty driver-side seat.

In some examples, the sensor device may include a seatbelt sensor, and the sensor signal may be indicative that a driver-side seatbelt is not fastened. A technical benefit may include alerting a driver and/or an outside observer of an operational risk indicated by an unbuckled seatbelt.

In some examples, the sensor device may include a camera, and the sensor signal comprises an image of a driver-side area of the vehicle. Determining the operation risk may be based on the image indicating an abnormal driver-side area condition. A technical benefit may include alerting a driver and/or an outside observer of an operational risk indicated by an abnormal driver-side area condition.

In some examples, activating an alarm may include activating an audio alarm device. A technical benefit may include alerting individuals within an audio range of the audio alarm of an operational risk.

In some examples, activating an alarm comprises activating a visual alarm device. A technical benefit may include alerting individuals within visual range of the visual alarm of an operational risk.

In some examples, activating an alarm may include activating an alarm device that is detectable by a driver of the vehicle. A technical benefit may include alerting the driver of an operational risk.

In some examples, activating an alarm may include activating an alarm device that is detectable outside the vehicle within a predetermined range. A technical benefit may include alerting individuals within the predetermined range of an operational risk.

In some examples, the method may further include determining whether a predetermined amount of time has elapsed after determining the operation risk. Activating an alarm may be further in response to determining that the predetermined amount of time has elapsed. A technical benefit may include providing an appropriate delay before activating an alarm device to reduce false alarms.

In some examples, the method may further include determining whether a predetermined amount of time after maintaining movement of the vehicle has elapsed, and, in response to determining whether a predetermined amount of time has elapsed, operating the vehicle to stop the vehicle.

A technical benefit may include providing an appropriate delay before stopping the vehicle to reduce disruptions in vehicle operations.

In some examples, operating the vehicle to stop the vehicle may include operating a brake device of the vehicle to stop the vehicle. A technical benefit may include performing a vehicle operation without driver input.

According to a second aspect of the disclosure, a vehicle may include a computer system configured to perform the method according to any of the examples above. The second aspect of the disclosure may seek to address the problem of a driver creating an operational hazard with respect to a vehicle. A technical benefit may include providing the ability to alert the driver and/or an outside observer to the operational risk.

In some examples, the vehicle comprises a paver vehicle. A technical benefit may include providing the ability to alert the driver and/or an outside observer to the operational risk associated with a paving operation.

According to a third aspect of the disclosure, a non-transitory computer-readable storage medium may include instructions, which when executed by a processor device, cause the processor device to perform the method according to any of the examples above. The third aspect of the disclosure may seek to address the problem of a driver creating an operational hazard with respect to a vehicle. A technical benefit may include providing the ability to alert the driver and/or an outside observer to the operational risk.

According to a fourth aspect of the disclosure, a computer program product may include program code for performing, when executed by a processor device, the method according to any of the examples above. The fourth aspect of the disclosure may seek to address the problem of a driver creating an operational hazard with respect to a vehicle. A technical benefit may include providing the ability to alert the driver and/or an outside observer to the operational risk.

According to a fifth aspect of the disclosure, a computer system may be configured to perform the method according to any of the examples above. The fifth aspect of the disclosure may seek to address the problem of a driver creating an operational hazard with respect to a vehicle. A technical benefit may include providing the ability to alert the driver and/or an outside observer to the operational risk.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

The disclosure relates generally to operational risks for vehicles, such as construction vehicles, and particularly to a vehicle alarm based on a detected operational risk. To address the problem of compliance with safety protocols for vehicles with automated operations, safety mechanisms may be provided to address operational risks caused by these and other behaviors while maintaining vehicle operation to ensure quality result.

In some examples, a computer-implemented method may include operating, by a processor device of a computer system, a vehicle at a predetermined speed. The method may further include receiving, from a sensor device, a sensor signal indicating an abnormal condition. The method may further include receiving, from a sensor device, a sensor signal indicating an abnormal condition. The method may further include, based on the sensor signal, determining, by the processor device, an operation risk. The method may further include, in response to determining the operation risk, activating, by the processor device, an alarm. The method may further include, in response to determining the operation risk, maintaining, by the processor device, operation of the vehicle at the predetermined speed. These and other examples may seek to address the problem of a driver creating an operational hazard with respect to a vehicle, thereby providing technical benefits, including alerting the driver and/or an outside observer to the operational risk while maintaining vehicle operation to ensure quality result.

Figure 1A:
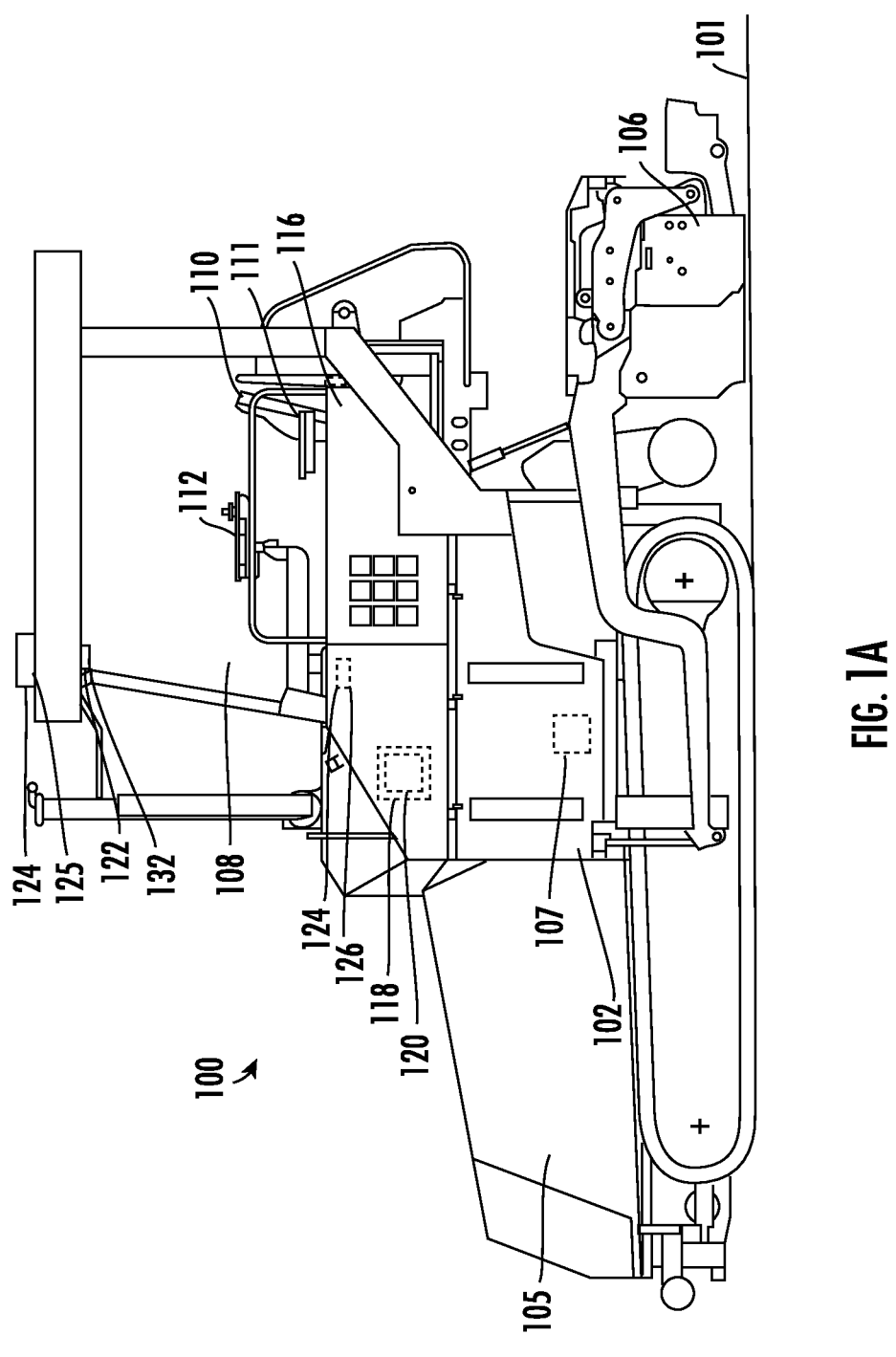
FIGS. 1A and 1B are exemplary views of a vehicle including a computer system configured to perform operations disclosed herein, according to one example.
Figure 1B:
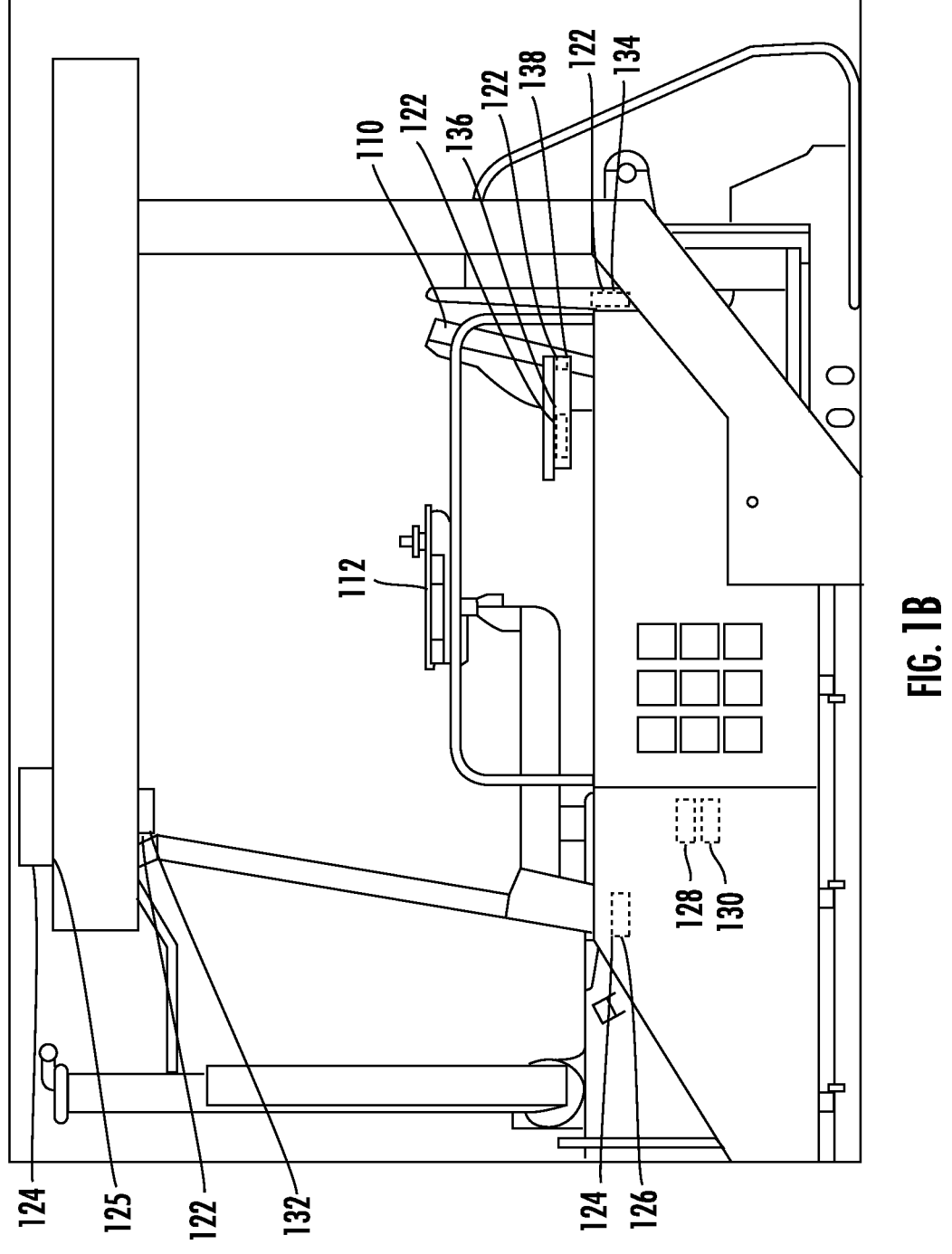

In this regard, FIGS. 1A and 1B illustrate an exemplary vehicle 100 according to one example. In this example, the vehicle 100 is a paver, but it should be understood that features described herein may be used with other types of vehicles as well, such as trucks, compactor, and/or working machines, etc. The vehicle 100 includes a frame 102 and a drive elements 104 (e.g., tracks or wheels) connected to the frame 102. The vehicle 100 may include one or more engines 107 and/or other propulsion devices for propelling the vehicle 100. In this example, a hopper 105 stores road paving material (e.g., asphalt, bitumen, etc.), which is moved to a screed 106 towed behind the frame 102 to spread and compact the paving material onto a road surface 101. A cab 108 may be disposed on the frame 102 and may include a driver-side area 112 including a seat 110 for a driver and a seatbelt mechanism 111. The driver may enter and exit the cab 108 via a driver-side door 116.

The vehicle 100 may further include a computer system 118 including a processor device 120 for operation of the vehicle 100 and for providing features disclosed herein. It should be understood that the computing system 118 may also, or alternatively, communicate with another computer system that may provide features disclosed herein.

As shown in FIG. 1B, the vehicle 100 may include a throttle device 128 for causing the vehicle 100 to move, e.g., in a forward direction, and a brake device 130, e.g., for slowing or stopping the vehicle 100. In some examples, the throttle device 128 and/or brake device 130 can be controlled selectively by the computing system 118 to move, slow, and/or stop the vehicle 100, and may also maintain the vehicle 100 as a predetermined speed. Selective operation of the throttle device 128 and/or brake device 130 includes efficient utilization of engine power with minimal losses. The selective operation of the throttle device 128 and/or the brake device 130 is prominent when vehicle is operated on inclination, slope, or uneven paving conditions. For example, slowing or stopping a paver vehicle during a paving operation may disrupt the paving operation and may result in a non-smooth paved surface. Thus, it may be desirable to maintain the paver vehicle at a relatively low constant speed (e.g., ~0.5 m/s) during a paving operation and to avoid slowing or stopping the paver vehicle during the paving operation when possible.

In this example, as shown in FIGS. 1A and 1B, the vehicle includes a plurality of sensor devices 122 and alarm devices 124 that may provide and/or receive signals from the computing system 118, e.g., to detect abnormal conditions and provide indications of operational risks, such as a driver leaving the cab 108 or preparing to leave the cab 108 while the vehicle 100 is moving. The alarm devices 124 may include visual alarm devices 125, e.g., a light-based alarm, and/or audio alarm devices 126, e.g., a vehicle horn or an alarm speaker. As shown by FIG. 1B, the sensor devices 122 may include a camera device 132 for producing images of the driver-side area 112, a door sensor 134 for detecting that the driver-side door 116 of the vehicle 100 is open, a seat sensor 136 for detecting that the driver-side seat 110 of the vehicle 100 is not occupied, and/or a seatbelt sensor 138 for detecting that a seatbelt mechanism 111 is unbuckled. While the above examples may be directed toward detecting a driver leaving the cab 108 or preparing to leave the cab 108, it should be understood that other sensors may be used to detect these and other abnormal conditions that may be indicative of these and other operational risks, as desired.

In one example, the processor device 120 of the computer system 118 may operate the vehicle 100 at a predetermined speed, e.g., to maintain the vehicle 100 at an appropriate speed during a paving operation. As noted above, in some examples, operating the vehicle 100 may include operating the throttle device 128 of the vehicle 100 to provide a constant amount of power to the engine 107 of the vehicle 100, and/or operating the brake device 130 of the vehicle 100 to limit the speed of the vehicle 100 to the predetermined speed.

The sensor devices 122 may provide sensor signals and, if one or more sensor signals indicates an abnormal condition, e.g., the driver leaving or preparing to leave the cab 108, the processor device 120 may determine an operational risk and activate one or more of the alarm devices 124. For example, the visual alarm device 125 may emit a bright and/or flashing light that may be detectable by the driver, e.g., to alert the driver of the operational risk and/or detectable outside the vehicle 100, e.g., to alert individuals in the vicinity of the vehicle 100 of the operational risk, e.g., that the vehicle 100 is unmanned. Alternatively, or in addition, the audio alarm device 126 may emit a loud sound that is similarly detectable by the driver and/or outside the vehicle 100, as desired.

In some examples, the processor device 120 may also, in response to the operational risk, maintain operation of the vehicle at the predetermined speed, e.g., via the throttle device 128 and/or brake device 130. In this regard, FIGS. 2A-2C provide an illustrative example of operating the vehicle 100 during a paving operation.

In some examples, the processor device 120 may determine whether a predetermined amount of time has elapsed after determining the operation risk before activating the alarm device 124, e.g., to reduce false alarms and to avoid activating the alarm device 124 when a driver is aware of an operational risk and is able to quicky remedy the operational risk. In some embodiments, the processor device 120 may determine whether a predetermined amount of time has elapsed after activating the alarm device 124 and/or maintaining movement of the vehicle 100. For example, if the predetermined amount of time elapses without the operational risk being addressed, the processor circuit may operate the vehicle 100 to stop the vehicle 100, e.g., by operating the brake device 130 of the vehicle 100 to stop the vehicle 100. For example, while it may be undesirable to stop the vehicle 100 during a paving operation, it may be determined the risk of allowing the operational risk to continue for too long may outweigh the risk of prematurely stopping the paving operation. In some examples, these features may be integrated into existing securitization functions of the vehicle 100. These and other features may be activated in response to predetermined vehicle states and/or operations, such as a detected vehicle speed outside a predetermined range, application of a brake or parking brake, activation of a Power Take Off (PTO) function, activation of a vehicle engine, etc.

Figures 2A, 2B, 2C:
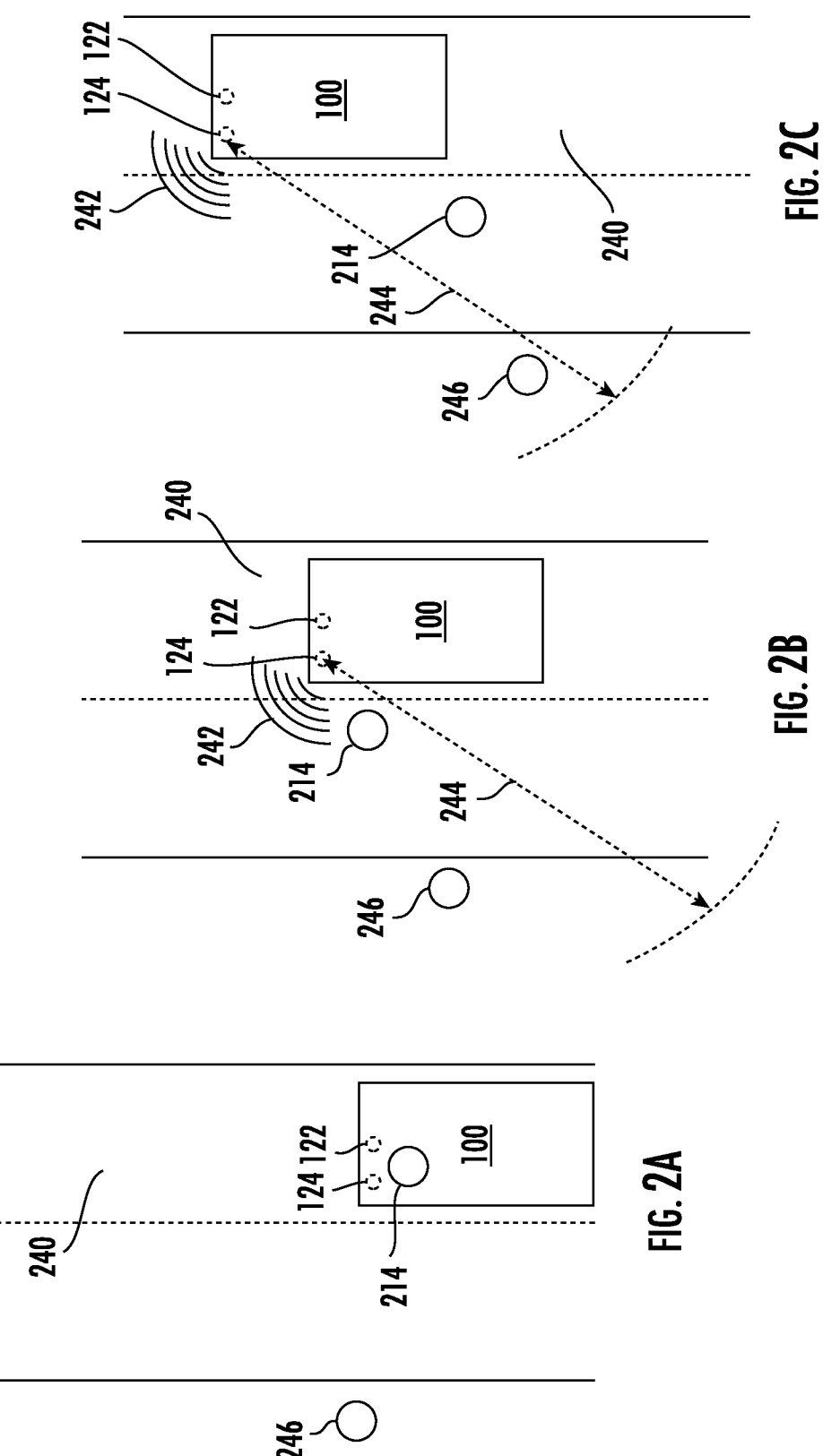
FIGS. 2A-2C illustrate an example of operating the vehicle of FIGS. 1A and 1B during a paving operation, according to one example.

As shown by FIG. 2A, a driver 214 of the vehicle 100 is operating the vehicle 100 during a paving operation on for a road surface 240. During the paving operation, the vehicle 100 is maintained at a predetermined speed, e.g., by the computer system 118 of FIG. 1A. As shown by FIG. 2B, the driver 214 exits the vehicle 100 while the vehicle 100 is being maintained at the predetermined speed, which creates an operational risk. For many types of paving operations, the vehicle 100 is maintained at a constant speed that is low enough for the driver 214 to enter and exit the moving vehicle without much difficulty. As a result, the driver 214 may be tempted to leave the vehicle 100 during the operation, e.g., to use a restroom, which creates significant operational risk.

In this example, as shown in FIG. 2B, one or more sensor devices 122 in the vehicle 100 detects that the driver 214 is leaving or has left the vehicle 100 and an alarm device 124 is activated. In this example, the alarm device 124 is an audio alarm device 126 that emits an audio alarm 242 that is detectable within a predetermined range 244, e.g., based on an audible range of the alarm 242, such that the driver 214 and an outside observer 246 within the range 244 can detect and react to the alarm 242.

As shown by FIG. 2C, the vehicle 100 continues to move forward while the alarm device continues to emit the alarm 242, thereby allowing the driver 214 and the outside observer 246 to be alerted to the operational risk without disrupting the paving operation, e.g., by stopping the vehicle 100.

Figure 3:
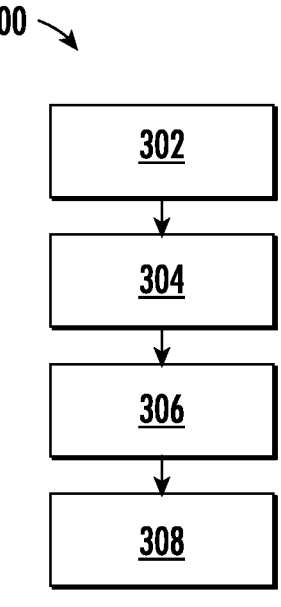
FIG. 3 is a flow chart of an exemplary method and operations to determine an operation risk for a vehicle and activate an alarm, according to one example.

FIG. 3 is a flow chart of exemplary method operations 300 to determine an operation risk for a vehicle and activate an alarm, according to one example. In this example, reference will be made to corresponding components of the vehicle 100 of FIGS. 1A and 1B, but it should be understood that these and other operations 300 are not limited thereto.

In this example, the operations 300 may include operating, by a processor device 120 of a computer system 118, a vehicle 100 at a predetermined speed (Block 302). The operations 300 may further include receiving from a sensor device 122, a sensor signal indicating an abnormal condition (Block 304).

The operations 300 may further include, based on the sensor signal, determining, by the processor device 120, an operation risk (Block 306). The operations 300 may further include, in response to determining the operation risk, activating, by the processor device 120, an alarm (e.g., via alarm device 124) (Block 308).

The operations 300 may further include, in response to determining the operation risk, maintaining, by the processor device 120, operation of the vehicle 100 at the predetermined speed (Block 310).

Figure 4:
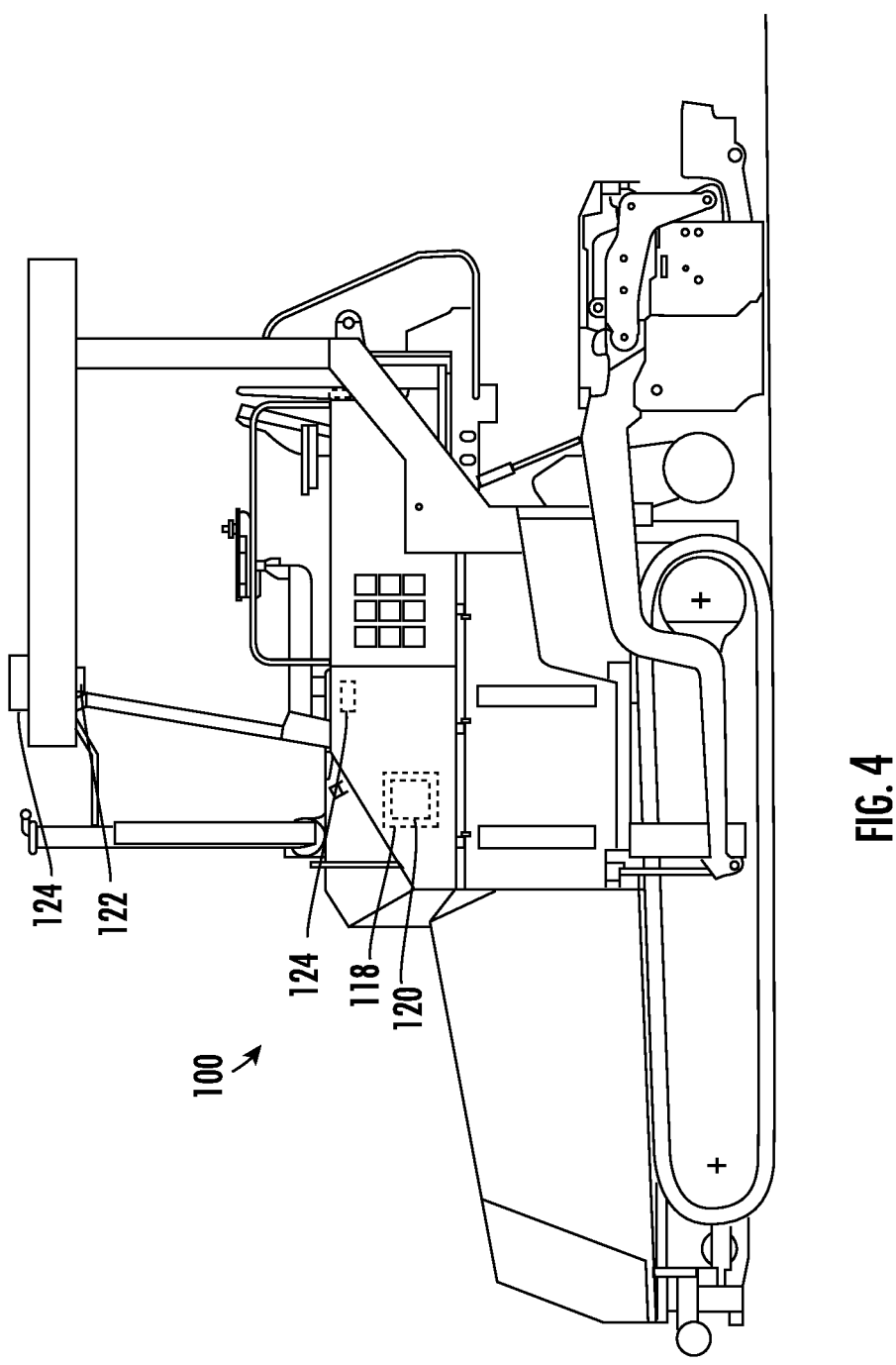
FIG. 4 is another view of the vehicle of FIG. 1A, according to another example.

FIG. 4 is another view of the vehicle 100 of FIG. 1A, according to another example. In this example, the vehicle 100 includes a computer system 118 having a processor device 120 configured to operate the vehicle 100 at a predetermined speed. The processor device 120 may be further configured to receive from a sensor device 122, a sensor signal indicating an abnormal condition. The processor device 120 may be further configured to, based on the sensor signal, determine an operation risk. The processor device 120 may be further configured to, in response to determining the operation risk, activate an alarm via an alarm device. The processor device 120 may be further configured to, in response to determining the operation risk, maintain operation of the vehicle 100 at the predetermined speed.

Figure 5:
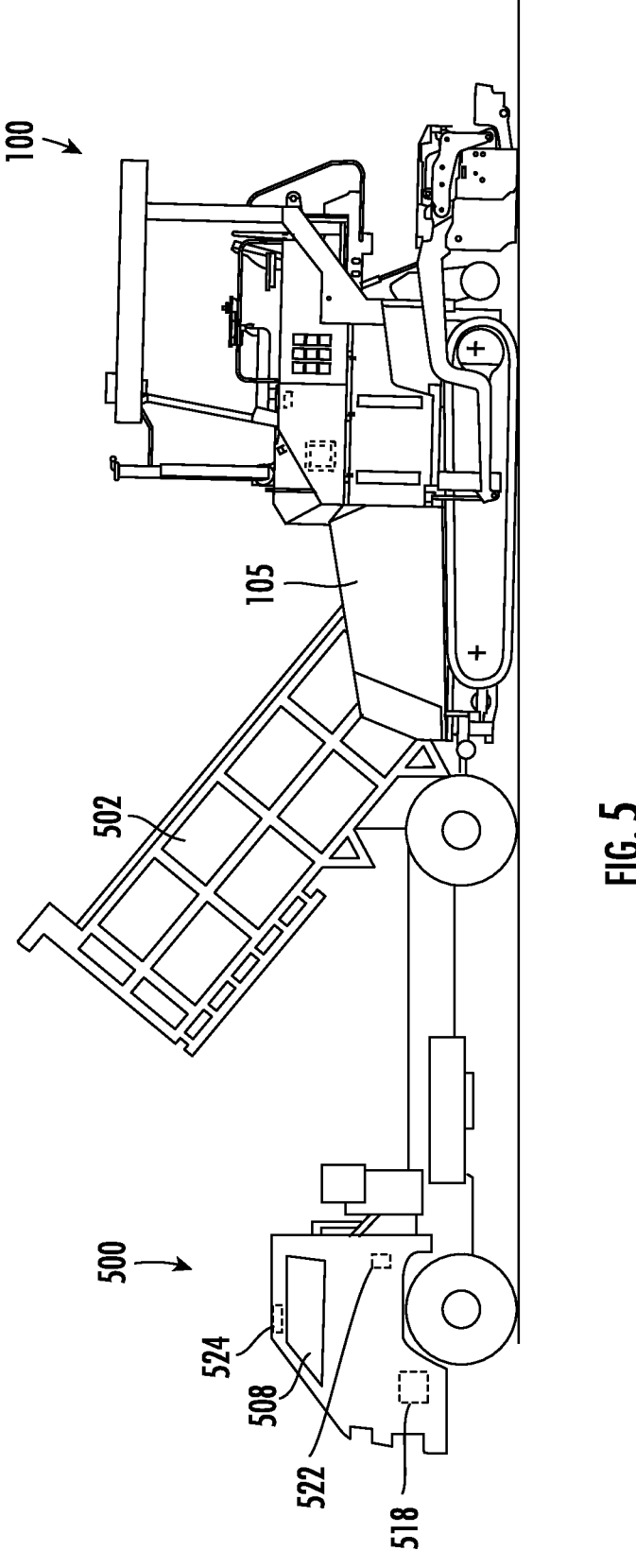
FIG. 5 is a view of the paver vehicle of FIG. 1A working in tandem with a dump truck, according to another example.

FIG. 5 is a view of the paver vehicle 100 of FIG. 1A working in tandem with a dump truck 500, according to another example. In this example, the truck 500 is pushed by the paver vehicle 100 while the dump truck 500 unloads road paving material into the hopper 105 from the dump truck bed 502. In this example, the dump truck 500 may be placed in neutral and is passively pushed forward by the paver vehicle 100. In some examples, the dump truck 500 may be configured to apply a small amount of braking to prevent unwanted movement on slopes or inclines. In this example, the dump truck includes a computer system 518, one or more sensor devices 522 and one or more alarm devices 524, which may be similar to the computer system 118, sensor devices 122, and alarm devices 124 of the paver vehicle 100 (as shown by FIGS. 1A and 1B).

The computer system 518, sensor device 522, and alarm device 524 may operate in a similar manner to the computer system 118, sensor devices 122, and alarm devices 124 of the paver vehicle 100 to receive sensor signals indicating an abnormal condition, determining an operation risk, and activating an alarm, while maintaining operation of the dump truck 500. For example, the computer system 518 may receive, from the sensor device 522, a sensor signal indicating an abnormal condition, such as a driver of the dump truck 500 leaving the cab 508 or preparing to leave the cab 508. Based on the sensor signal, the computer system 518 may determine an operation risk and activate an alarm of the alarm device 524 in response. The dump truck may also maintain operation, such as by continuing to unload road paving material and/or continuing to move forward in tandem with the paver vehicle 100, e.g., by being pushed forward by the paver vehicle 100 and/or by moving forward using an onboard propulsion system (e.g., engine) of the dump truck 500.

Figure 6:
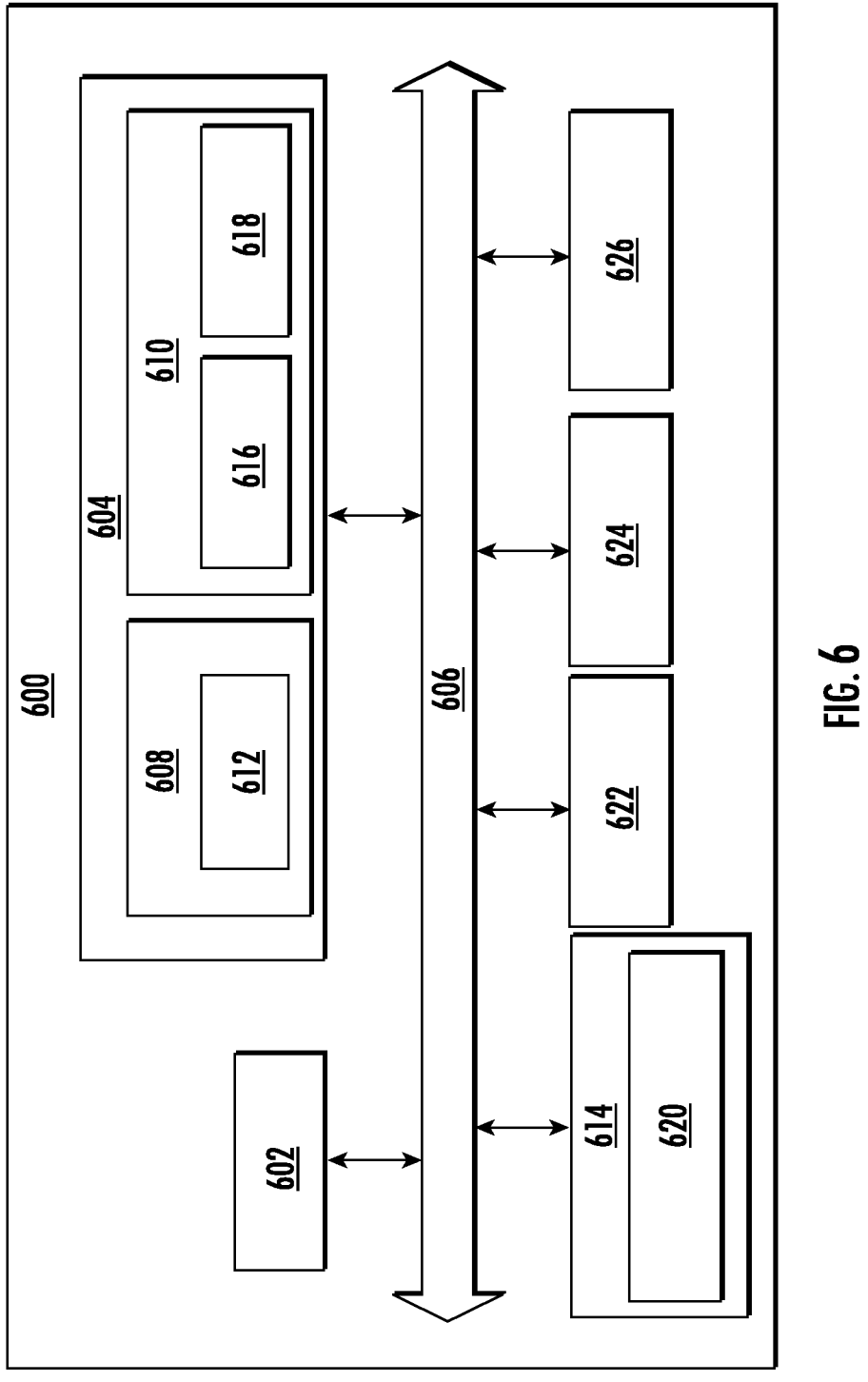
FIG. 6 is a schematic diagram of an exemplary computer system for implementing examples disclosed herein, according to one example.

FIG. 6 is a schematic diagram of a computer system 600 for implementing examples disclosed herein. The computer system 600 is adapted to execute instructions from a computer-readable medium to perform these and/or any of the functions or processing described herein. The computer system 600 may be connected (e.g., networked) to other machines in a LAN, an intranet, an extranet, or the Internet. While only a single device is illustrated, the computer system 600 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit, or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 600 may comprise at least one computing device or electronic device capable of including firmware, hardware, and/or executing software instructions to implement the functionality described herein. The computer system 600 may include a processor device 602 (may also be referred to as a control unit), a memory 604, and a system bus 606. The computer system 600 may include at least one computing device having the processor device 602. The system bus 606 provides an interface for system components including, but not limited to, the memory 604 and the processor device 602. The processor device 602 may include any number of hardware components for conducting data or signal processing or for executing computer code stored in memory 604. The processor device 602 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 606 may be any of several types of bus structures that may further interconnect to a memory bus (with or without a memory controller), a peripheral bus, and/or a local bus using any of a variety of bus architectures. The memory 604 may be one or more devices for storing data and/or computer code for completing or facilitating methods described herein. The memory 604 may include database components, object code components, script components, or other types of information structure for supporting the various activities herein. Any distributed or local memory device may be utilized with the systems and methods of this description. The memory 604 may be communicably connected to the processor device 602 (e.g., via a circuit or any other wired, wireless, or network connection) and may include computer code for executing one or more processes described herein. The memory 604 may include non-volatile memory 608 (e.g., read-only memory (ROM), erasable programmable read-only memory (EPROM), electrically erasable programmable read-only memory (EEPROM), etc.), and volatile memory 610 (e.g., random-access memory (RAM)), or any other medium which can be used to carry or store desired program code in the form of machine-executable instructions or data structures and which can be accessed by a computer or other machine with a processor device 602. A basic input/output system (BIOS) 612 may be stored in the non-volatile memory 608 and can include the basic routines that help to transfer information between elements within the computer system 600.

The computer system 600 may further include or be coupled to a non-transitory computer-readable storage medium such as the storage device 614, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 614 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 614 and/or in the volatile memory 610, which may include an operating system 616 and/or one or more program modules 618. All or a portion of the examples disclosed herein may be implemented as a computer program product 620 stored on a transitory or non-transitory computer-usable or computer-readable storage medium (e.g., single medium or multiple media), such as the storage device 614, which includes complex programming instructions (e.g., complex computer-readable program code) to cause the processor device 602 to carry out the steps described herein. Thus, the computer-readable program code can comprise software instructions for implementing the functionality of the examples described herein when executed by the processor device 602. The processor device 602 may serve as a controller or control system for the computer system 600 that is to implement the functionality described herein.

The computer system 600 also may include an input device interface 622 (e.g., input device interface and/or output device interface). The input device interface 622 may be configured to receive input and selections to be communicated to the computer system 600 when executing instructions, such as from a keyboard, mouse, touch-sensitive surface, etc. Such input devices may be connected to the processor device 602 through the input device interface 622 coupled to the system bus 606 but can be connected through other interfaces such as a parallel port, an Institute of Electrical and Electronic Engineers (IEEE) 1394 serial port, a Universal Serial Bus (USB) port, an IR interface, and the like. The computer system 600 may include an output device interface 624 configured to forward output, such as to a display, a video display unit (e.g., a liquid crystal display (LCD) or a cathode ray tube (CRT)). The computer system 600 may also include a communications interface 626 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A computer-implemented method comprising:
   operating, by a processor device of a computer system, a vehicle at a predetermined speed, wherein the vehicle is a paver vehicle, and wherein the predetermined speed is a predetermined paving speed suitable for a paving operation;
   receiving, from a sensor device, a sensor signal indicating an abnormal condition;
   based on the sensor signal, determining, by the processor device, an operation risk;

in response to determining the operation risk, activating, by the processor device, an alarm; and in response to determining the operation risk, maintaining, by the processor device, operation of the paver vehicle at the predetermined paving speed to maintain continuity of the paving operation and prevent defects associated with speed variation during paving.

2. The method according to claim 1, wherein operating the vehicle comprises:

operating a throttle device of the vehicle to provide a constant amount of power to an engine of the vehicle; and operating a brake device of the vehicle to limit a speed of the vehicle to the predetermined speed, wherein the sensor device comprises a door sensor, wherein the sensor signal is indicative that a driver-side door of the vehicle is open.

3. The method according to claim 1, wherein activating the alarm comprises: activating an audiovisual alarm that is detectable outside the vehicle, and wherein maintaining operation of the vehicle comprises operating the throttle device and the brake device to maintain the speed of the vehicle at the predetermined speed.

4. The method according to claim 1, wherein operating the vehicle comprises:

operating a throttle device of the vehicle to provide a constant amount of power to an engine of the vehicle.

5. The method according to claim 1, wherein operating the vehicle comprises operating a brake device of the vehicle to limit a speed of the vehicle to the predetermined speed.

6. The method according to claim 1, wherein the sensor device comprises a door sensor, and wherein the sensor signal is indicative that a door of the vehicle is open.

7. The method according to claim 1, wherein the sensor device comprises a seat sensor, and wherein the sensor signal is indicative that a driver-side seat of the vehicle is not occupied.

8. The method according to claim 1, wherein the sensor device comprises a seatbelt sensor, and wherein the sensor signal is indicative that a driver-side seatbelt is not fastened.

9. The method according to claim 1, wherein the sensor device comprises a camera, wherein the sensor signal comprises an image of a driver-side area of the vehicle, and wherein the determining the operation risk is based on the image indicating an abnormal driver-side area condition.

10. The method according to claim 1, wherein activating the alarm comprises activating at least one of an audio alarm device and a visual alarm device.

11. The method according to claim 1, wherein activating the alarm comprises activating an alarm device that is detectable by a driver of the vehicle.

12. The method according to claim 1, wherein activating the alarm comprises activating an alarm device that is detectable outside the vehicle within a predetermined range.

13. A vehicle comprising a computer system configured to perform the method according to claim 1.

14. A non-transitory computer-readable storage medium comprising instructions, which when executed by a processor device, cause the processor device to:

operate a vehicle at a predetermined speed, wherein the vehicle is a paver vehicle, and wherein the predetermined speed is a predetermined paving speed suitable for a paving operation;

receive, from a sensor device, a sensor signal indicating an abnormal condition;

based on the sensor signal, determine an operation risk;

in response to determination of the operation risk, activate an alarm; and in response to determination of the operation risk, maintain operation of the paver vehicle at the predetermined paving speed to maintain continuity of the paving operation and prevent defects associated with speed variation during paving.

15. The non-transitory storage medium according to claim 14, wherein the instructions further cause the processor device to:

determine whether a predetermined amount of time has elapsed after determination of the operation risk, wherein activation of the alarm is further in response to determination that the predetermined amount of time has elapsed.

16. The non-transitory storage medium according to claim 14, wherein the instructions further cause the processor device to:

determine whether a predetermined amount of time after maintaining movement of the vehicle has elapsed; and in response to determination whether a predetermined amount of time has elapsed, operate the vehicle to stop the vehicle.

17. The non-transitory storage medium according to claim 16, wherein the instructions to operate the vehicle to stop the vehicle further comprises instructions that cause the processor device to:

operate a brake device of the vehicle to stop the vehicle.

18. A computer system comprising:

a processor device; and a non-transitory storage medium storing instructions, the instructions when executed by the processing device cause the processing device to:

operate a vehicle at a predetermined speed, wherein the vehicle is a paver vehicle, and wherein the predetermined speed is a predetermined paving speed suitable for a paving operation;

receive, from a sensor device, a sensor signal indicating an abnormal condition;

based on the sensor signal, determine an operation risk;

in response to determination of the operation risk, activate an alarm; and in response to determination of the operation risk, maintain operation of the paver vehicle at the predetermined paving speed to maintain continuity of the paving operation and prevent defects associated with speed variation during paving.

19. The computer system according to claim 18, wherein the instructions to operate the vehicle comprises instructions to:

operate at least one of a throttle device and a brake device of the vehicle selectively to provide a constant amount of power to an engine of the vehicle.

* * * * *